Figure 1:
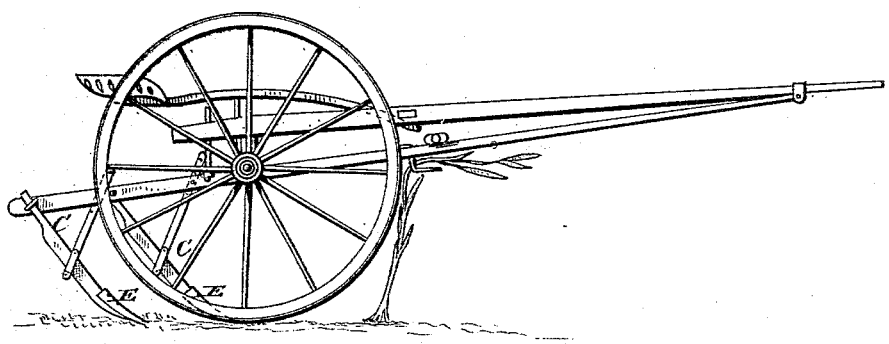

(No Model.)

J. PRITCHARD.
CORN CULTIVATOR.

No. 339,580. Patented Apr. 6, 1886.

WITNESSES
F. L. Ourand
G. S. Elliott

INVENTOR
James Pritchard
Per Edw. W. Donn & Co.
Attorneys.

UNITED STATES PATENT OFFICE.

JAMES PRITCHARD, OF LE MARS, IOWA.

CORN-CULTIVATOR.

SPECIFICATION forming part of Letters Patent No. 339,580, dated April 6, 1886.

Application filed September 16, 1885. Serial No. 177,292. (No model.)

*To all whom it may concern:*

Be it known that I, JAMES PRITCHARD, a citizen of the United States, residing at Le Mars, in the county of Plymouth and State of Iowa, have invented certain new and useful Improvements in Corn-Cultivators; and I do hereby declare the following to be a full, clear, and exact description of the invention, such as will enable others skilled in the art to which it appertains to make and use the same.

My invention is an improvement in that class of corn plows or cultivators in which the draft-tongue is divided near the place for the neck-yoke and thence diverging in two beams which incline downward, (being supported by the axle-trees,) the rear ends of which form supporting-arms for the standards which carry the shears or shovels of the plows. Cultivators of this class have usually two plows to each arm of the bifurcated tongue, and said plows are so arranged that one row of corn is straddled and the two plows on each side of the said row cultivate the plants by loosening the soil partly for the benefit of three rows at one drive or passage through the field. These cultivators, though valuable to farmers on account of the simplicity of their construction and arrangement, have some objectionable qualities, one of which is the tendency of the beams of the divided or bifurcated tongue to drag down and break off the corn-plants when they are about two feet in height while the cultivator is being used. The plants of the center row which extend upward and spread laterally while the cultivator is passing are caught by one or the other of the arms of the divided tongue and carried downward with the inclination of said arm or arms until they are overtaken by the straps which brace the standards to said arms, and at the intersections of these bracing-rods with the said arms, or at the points of intersection of said rods with the standards, the corn is broken off or otherwise destroyed.

The object of one feature of my improvement is to provide a device in the form of a hook to be secured to each beam at a point just back of the evener, which extends downward and forward, being curved in such a manner as to catch the stalk of the plant, and deflect it inward toward its normal position before it is reached by the standard or straps which brace the same.

The second part of my invention is an improvement in the standards for the plows, the object being to facilitate the draft and render the work easier and more effective with a given amount of power. The upper ends of the beams of the standards as at present constructed are held to the long beams or arms by loops and braced to said beams or arms by metal rods or straps, which are adjustable for the purpose of reducing or increasing the angles formed between said arms and the said standards which carry the plows to reduce or increase the draft by allowing the plows to run shallow or deep. The standards as at present constructed are made with their terminations back of the plows very thick and heavy, so that when the angles between the arms and the standards are acute to a certain degree there is formed a resistance while the cultivator is in operation which requires extra power to overcome, and at the same time the points of the plows are deflected upward, so that the plows will run shallow by reason of the resistance met with by the heels of the standards.

In my improvement I shape the standards, as will be hereinafter set forth, so as to modify these objections, and when said standards are properly set with reference to the supporting-arms I am enabled to plow deep with but little resistance in draft while I break up or refine the land without forming clods to bake on the surface of the ground.

Figure 2:
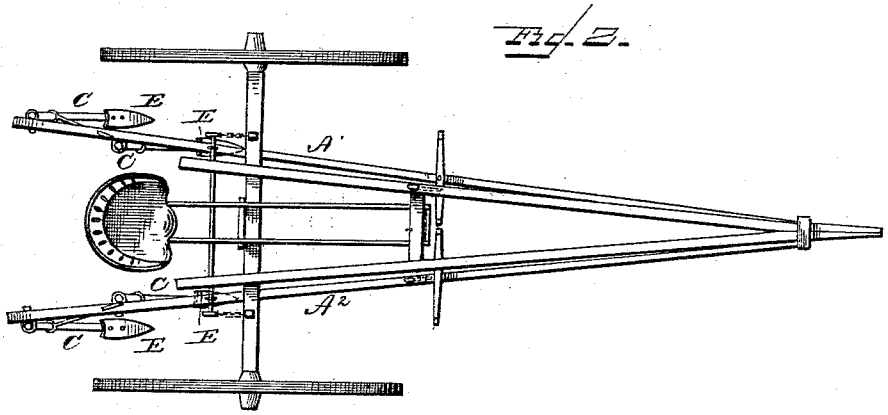
Figure 3:
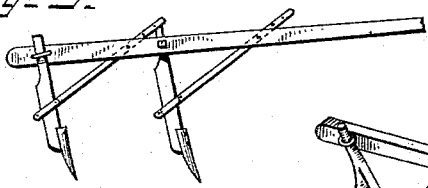
Figure 4:
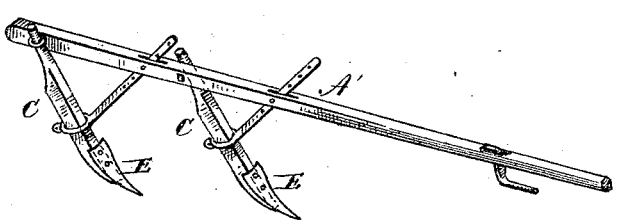

In my drawings illustrating my improvement, Figure 1 is a side elevation of a corn-cultivator, showing my improvements. Fig. 2 is a plan or top view of the same, illustrating the effect of the movement of the cultivator without my improvements. Fig. 3 is a detail showing a standard and the arm to which it is attached formed in the old way. Fig. 4 is a detail showing my improvement in the form of the standard.

Similar reference-letters in my drawings indicate like parts in all of the figures.

Referring to the drawings, A is the tongue, and $A'$ $A^2$ are the separating and downwardly-inclined arms or beams which branch from the said tongue.

B is the evener to which the single-trees are attached.

C C' are the standards looped on opposite sides of the arms A' A². D are the bracing-straps which adjust the said standards C with reference to the arms A' A². Plows E E are fixed to the said standards in the usual manner.

F is a hook secured to one of the arms A' or A² close in rear of the evener B. This hook is formed of metal with its point tending outward and downward. It is preferably secured to the arm by being driven through a hole prepared for it and having its upper end turned at right angles backward and buried longitudinally into the grain of the wood of said arm, to prevent its being turned from its place. The manner of securing the hook to place, however, is immaterial, as it may be secured in any proper manner, so that its free end will bear the relation to the under side of the arm at a proper point, so that it will catch and arrest the downward movement of the plant and shunt it inward to its proper position.

$ff$ represent the heels of the standard as ordinarily constructed. $g g$ show the standards with their heels cut away raking snugly to the concave surface of the plows. These ends, if it be necessary to strengthen them, may be re-enforced with metal, in a manner, however, not to interfere with the form as shown.

Having thus described my invention, what I claim as new, and desire to secure by Letters Patent, is—

In a corn-cultivator, the combination, with the draft-pole and diverging beams A' A², of the hook F, secured to the under side of and pointing forward in line with said beams, substantially as and for the purpose set forth.

In testimony whereof I affix my signature in presence of two witnesses.

JAMES PRITCHARD.

Witnesses:
WILLIAM MORGAN,
W. F. COOPER.